March 28, 1967 W. CURLOOK 3,311,466
REDUCTION OF METAL OXIDES
Filed Nov. 6, 1964
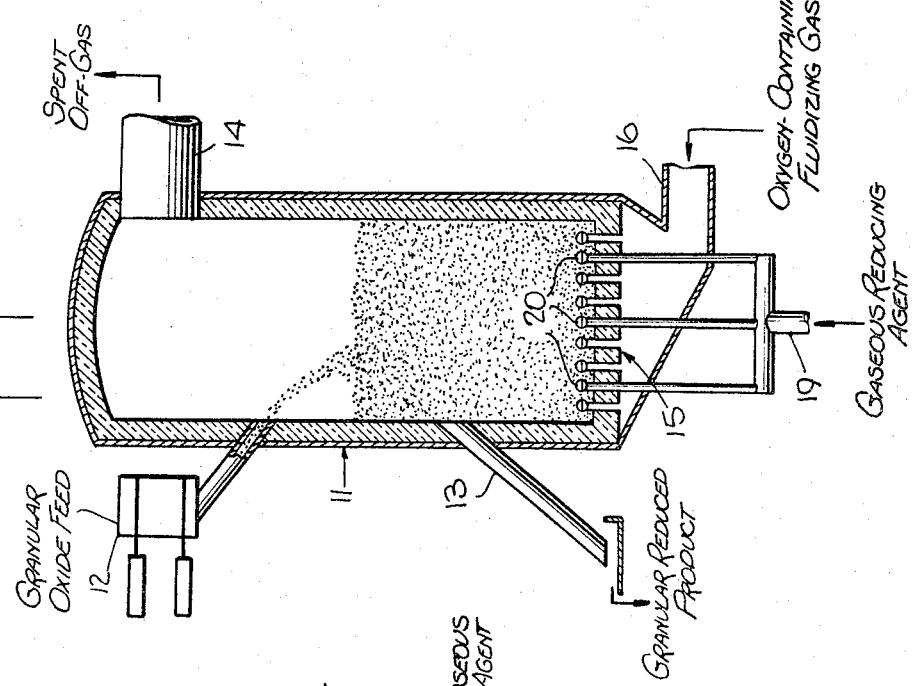
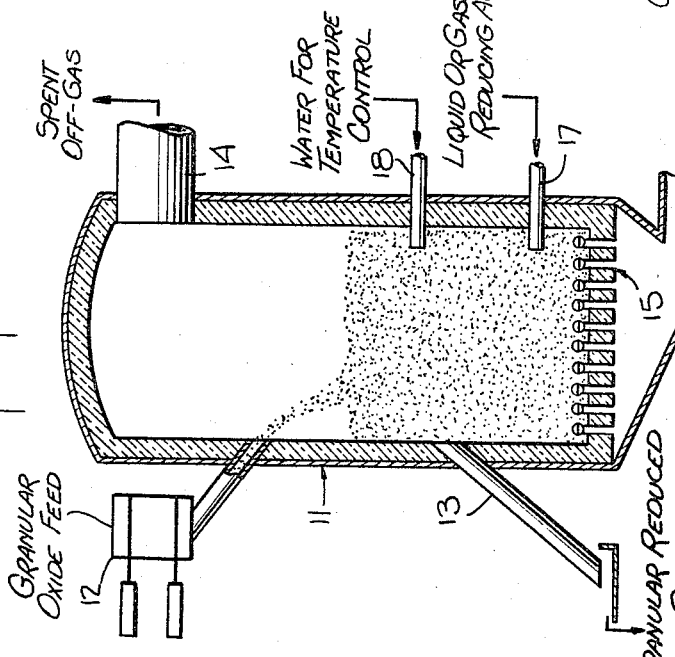
INVENTOR.
WALTER CURLOOK
BY
M. S. Pinel
ATTORNEY United States Patent Office 3,311,466
Patented Mar. 28, 1967

3,311,466
REDUCTION OF METAL OXIDES
Walter Curlook, Copper Cliff, Ontario, Canada, assignor to The International Nickel Company, Inc., New York, N.Y., a corporation of Delaware
Filed Nov. 6, 1964, Ser. No. 409,381
Claims priority, application Canada, Nov. 29, 1963, 890,227
6 Claims. (Cl. 75—26)

The present invention relates to an improved method for reducing metal oxides and more particularly to an improved method for reducing granules of metal oxides such as nickel oxide while substantially avoiding fusion between granules and producing a uniform, granular and reactive metal product.

Reduction of coarse sintered nickel oxide materials has heretofore usually been attained by treatment in anode furnaces at high temperature to yield a molten nickel product; and reduction of fine nickel oxide has usually been carried out in hearth-type furnaces at low temperatures to prevent fusion.

Fluid bed reduction has a number of known advantages such as high capacity, ease of accurate control of operating conditions and mechanical simplicity. However, fluid bed reduction of finely-divided oxides normally requires the use of a large diameter reactor to provide a space velocity sufficiently low to avoid excessive carryover of fines from the bed. In addition, at low fluidizing velocity it has been found that fusion or agglomeration of the material in the fluid bed is prevalent, particularly in the case of nickel oxide. Apart from operating disadvantages such as defluidization and blockage of air inlets, the reduction of partly fused agglomerates is incomplete resulting in a retention of oxygen content beyond desired levels in the product. Although attempts were made to overcome the foregoing difficulties and other difficulties, none, as far as I am aware, was entirely successful when carried into practice commercially on an industrial scale.

It has now been discovered that metal oxides such as nickel oxide can be successfully reduced by fluid bed techniques at high throughput rates to a granular metal product of desired low oxygen content.

It is an object of the present invention to provide a novel method for the fluid bed reduction of metal oxides with production of a granular, dust-free metallic product.

Another object of the invention is to provide a method for reducing metal oxides by fluid bed techniques to produce an unfused metal product with desired low oxygen content.

The invention also contemplates providing a novel process for nearly complete reduction of metal oxides in a fluid bed reactor while avoiding sticking and fusion in the bed.

It is a further object of the invention to provide a unique method of producing from nickel oxide materials a granular, substantially dust-free product with exceptional activity and low oxygen content.

The invention further contemplates providing a novel method for the reduction of metal oxides containing varying amounts of nickel, copper, cobalt and iron with production of a granular product which is very low in oxygen content.

Other objects and advantages of the invention will become apparent from the following description taken in conjunction with the accompanying drawing in which:

FIGURE 1 depicts a form of fluid bed apparatus adapted for carrying out the process embodying the present invention; and FIGURE 2 depicts a modification of the fluid bed apparatus depicted in FIGURE 1, which modification is also adapted for carrying out the process embodying the present invention.

Generally speaking, the present invention contemplates reducing metal oxide granules, obtained from the fluid bed roasting of granulated or pelletized sulfides and containing varying amounts of nickel, copper, cobalt and iron, in a fluid bed reactor at relatively low temperatures using air, oxygen, or oxygenated air as a fluidizing and oxidizing medium, introducing a gaseous or liquid reducing agent (fuel) such as natural gas, oil, synthesis gas, hydrogen, or carbon monoxide into the bed and maintaining conditions of incomplete combustion within the reactor to provide heat and a reducing gaseous medium for effecting the reduction of the metal oxide granules to metal granules on a continuous basis. Those skilled in the art know that "synthesis gas" comprises gas mixtures containing hydrogen and carbon monoxide in varying proportion such as water gas, and may be made by reacting steam with carbon or natural gas at elevated temperature, by partial oxidation of natural gas, etc.

Feeding the metal oxide material in the form of granules to the fluid bed reactor enables the substantially complete reduction of the metal oxide to a granular metal product whereas feeding of such oxides directly to the reactor in a finely-divided form such as a powdered form, e.g., such that the particles will pass a 200-mesh screen, results in low throughput, in sticking and fusion between particles in the bed with concomitant mechanical difficulties, incomplete removal of oxygen and commercial impractibility for the process.

The reduction operation is conducted at temperatures of between about 900° F. and 1850° F. or about 1900° F. with temperature being controlled by regulation of the fuel to air ratio supplied to the reactor and, if necessary, by the addition of water. The temperature of operation will depend in part on the nature of the oxide feed, but primarily on the reducing agent employed. With hydrocarbon fuels higher temperatures within the aforementioned range are required; but when employing reducing gases high in hydrogen the reduction can be effected at substantially lower temperatures, in the neighborhood of 900° F. A product which is substantially completely reduced can be continuously withdrawn from the bed at about the same rate as new feed to the bed.

In carrying the invention into practice, sufficiently coarse granular material with a particle size of not less than about 0.004 inch and not more than about 0.1 inch is fed into the reactor through a suitable sealing feeder. The oxide granules are a substantially dust-free and uniform product obtained from the suspension roasting of pelletized or granulated sulfides obtained as flotation are concentrates or flotation matte concentrates and containing varying amounts of nickel, cobalt, copper and iron. The oxide granules which may be treated by the present invention will generally have a particle size of not more than about 8 mesh and not more than about 5% minus 100 mesh and will contain substantial quantities of nickel and may contain varying amounts of other base elements such as copper, cobalt and iron. U.S. Patent No. 3,094,409 describes the production of a granulated oxide material suitable for feed in the process embodying the present invention.

Air, oxygen, or oxygen-enriched air is blown into the bottom of the reactor at a rate which will maintain the granules in a fluidized condition. The fluidizing gas velocities which must be used to maintain fluidization vary with the size of oxide granules fed to the bed. It has been found that "apparent" fluidizing gas velocities of between about 3 feet per second to about 8 feet per second should be used to fluidize the granules. However, velocities of up to about 13 feet per second have been used with particularly coarse granules. Advantageously, the velocity should be 5 to 7 feet per second.

The reducing agent, i.e., oil, natural gas, synthesis gas, hydrogen, or carbon monoxide is introduced into the fluid bed, usually at points up to about 2 feet above the grate; but it may be introduced in part with the oxidizing gas. When employing a hydrocarbon fuel, the introduction rates of the oxygen-containing fluidizing medium and reducing agent are controlled so that only about 30% to about 60% of the oxygen required to burn the reducing agent to completion is blown into the reactor in the fluidizing gas. The manner in which the reducing agent is introduced into the reactor will depend in part on the physical and chemical nature of the fuel. When using liquid fuel such as oil, it is found most practical to introduce the oil through lances situated up to 12 inches above the grate. Natural gas, on the other hand, is best introduced through separate tuyeres situated in the grate; although good results are obtained when natural gas is introduced through lances situated above the grate as in the case of oil. These different techniques are depicted in FIGURES 1 and 2. In each of FIGURES 1 and 2, reference character 11 depicts a fluid bed reactor having a feeder means 12, a product offtake 13, a spent gas offtake 14, a grate 15, and fluidizing gas admitting means 16. In FIGURE 1, a lance 17 for admitting liquid or gaseous reducing agent above the grate and a water lance 18 for admitting cooling water to the reactor are depicted. A similar water-admitting means can also be employed with the embodiment depicted in FIGURE 2. In FIGURE 2, an admitting means comprising a bustle 19 and tuyeres 20 for feeding gaseous reducing agent above the grate is depicted. If desired, a portion or all of the gaseous reducing agents can be introduced into the air bustle; however, very special precautions must be taken if this technique is adopted particularly when the proportion of oxygen-containing gas to reducing gas is within explosive limits. Under certain circumstances it may be desirable to preheat either the oxygen-containing fluidizing gas or the fuel, or both. It may be economically advantageous in certain areas to substitute solid reducing agent for part or all of the fuel. In such a case, the solid fuel must be crushed and can be added with the oxide feed, or separately, to the reactor.

Use of oxygen in the fluidizing medium in amounts lower than about 30% of that required to burn hydrocarbon reducing agents to completion results in incomplete and inefficient use of the fuel. The proportion of oxygen-containing gas employed is limited to a quantity which will not produce excessive temperatures in the fluidized bed.

The temperature in the fluid bed is controlled at between about 900° F. and about 1900° F. depending on the nature of the reducing gas. With liquid or gaseous hydrocarbon fuels temperatures are advantageously maintained between about 1600° F. and 1850° F. by regulation of the oxygen to fuel ratio. The activity of the oxide feed will determine, to a degree, the optimum reduction temperature. Water may also be added to the fluid bed as an additional means for regulation of temperature by adding it directly to the bed or as a spray into the top of the bed. Temperature may also be regulated by controlled recirculation of cooled product.

Nickel oxide granules employed in the following examples were produced from a fine nickel sulphide concentrate obtained by flotation of copper-nickel Bessemer matte. The tailings of the flotation operation is a nickel sulphide analyzing 0.5% to 3% copper, 75% to 70% nickel, 0.1% to 1% iron, about 0.8% cobalt and 26% to 27% sulphur. The nickel sulphide, about 90% minus 325 mesh, was pelletized into green pellets of $\frac{1}{8}$-inch to $\frac{1}{4}$-inch size and fed to a fluid bed roaster wherein it was converted to oxide of less than 0.5% sulfur at temperatures in the neighborhood of 2000° F. The product was a granular nickel oxide essentially all minus 10 mesh and plus 100 mesh size.

In the reduction of an oxide material which has a high iron content, e.g., a ferronickel oxide containing about 25% to 35% nickel, and 40% to 35% iron, it is possible, by regulating the oxidizing medium to fuel ratio in the fluid bed, to selectively reduce the nickel leaving a substantial proportion of the iron in the oxide granules unreduced. By such a technique, a partially reduced granular material is obtained with substantially all the nickel and cobalt and a small proportion of the iron in metallic form. Such partially-reduced granules are suitable for preferential extraction of the nickel by hydrometallurgical or vapometallurgical techniques. On the other hand, it may be desirable for certain uses to have the iron as well as the nickel substantially completely reduced; and in such a case stronger reducing conditions must be established in the reactor.

Fluid bed reduction of oxide granules by the hereinbefore described novel technique is particularly applicable to oxides produced from flotation concentrates, from mattes and other sulphide materials which have high nickel contents and which contain minor amounts of cobalt and/or copper, but which may contain significant quantities of iron, with the balance substantially all sulfur. Such mattes and other sulphide materials have a nickel content of at least about 20% but as high as 75% and are pelletized or granulated and roasted to a sulfur content of less than about 2% and preferably to less than 0.2%, to provide oxide granules to be treated according to the hereindescribed invention.

The hot granules obtained from the reducing operation which are over 80% reduced and preferably as much as 95% reduced, may be cooled by known means such as by quenching directly in water or by cooling in a fluidized bed type of vessel, wherein the fluidizing medium can be air or more advantageously an inert gas such as nitrogen and/or carbon dioxide.

It is to be noted that the production of carbon in the fluidized reducing operation is minimized or even prevented by the presence of the reduced metal in the bed. Sticking and fusion in the bed is eliminated by the use of the substantially dust-free granular oxide feed, even though the oxide is substantially completely reduced in a single fluid bed operation, and the bed is composed to a major extent of reduced material with only the new feed being oxide.

Reduced granules with a high nickel content, obtained from oxide granules containing over 70% nickel, and very low in oxygen content, can be marketed directly or melted and cast into shapes for refining or direct sale. Such granules may be used also for copper cementation during purification of nickel electrolyte.

For the purpose of giving those skilled in the art a better understanding of the invention the following illustrative examples are given:

*Example I*

Nickel oxide pellets containing minor amounts of impurities, e.g., less than 1% copper, less than 0.5% iron, less than 0.1% sulfur and less than 1.5% of gangue materials, and being over 90% minus 10 mesh and less than 1% minus 100 mesh in size, were fed continuously at 220 pounds per hour per square foot of grate area to a furnace of the fluid bed type of 30 inches inside diameter at a point about 19 feet above the grate. Air was introduced through the grate at 450 standard cubic feet per minute while oil was introduced directly into the bed about 1 foot above the grate and at a rate of about 31 U.S. gallons per hour. Temperatures were maintained in the neighborhood of 1760° F. and a granular product over 95% reduced was continuously withdrawn at a point about 8 feet above the grate and quenched directly in water. Control of temperature was obtained by maintaining the air to fuel ratio and by adding water to the bed. The off-gases from the reactor analyzed 21% $CO_2$, 3% CO, and 1.3% of hydrocarbons. The particle sizes of the oxide feed and the reduced nickel product are given in the following table:

| Mesh Size | Oxide Feed | Reduced Product |
|---|---|---|
| | Percent | Percent |
| +10 | 7.9 | 9.2 |
| −10+20 | 44.3 | 28.8 |
| −20+35 | 41.2 | 32.4 |
| −35+65 | 6.1 | 27.3 |
| −65+100 | 0.1 | 1.4 |
| −100 | 0.4 | 0.9 |

A similar material but slightly finer nickel oxide, containing 4% minus 100 mesh material was reduced successfully, under similar conditions, to yield a product that was 95% reduced.

*Example II*

A similar nickel oxide granular material to that described in Example I, but containing up to 3% copper and about 0.5% sulfur was fed to the same reactor continuously at about 180 pounds per hour per square foot of grate area. Air was introduced through the grate at 430 standard cubic feet per minute while oil was introduced directly into the bed, at about 32 U.S. gallons per hour. Temperatures were maintained at 1840° F. and a granular product about 85% reduced was continuously withdrawn. The screen analyses of feed and reduced product were as follows:

| Mesh Size | Oxide Feed | Reduced Product |
|---|---|---|
| | Percent | Percent |
| +10 | 1.2 | 0.1 |
| −10+20 | 1.4 | 1.2 |
| −20+35 | 33.5 | 37.0 |
| −55+65 | 60.1 | 56.1 |
| −65+100 | 3.6 | 5.0 |
| −100 | 0.2 | 0.6 |

It is to be observed that the present invention provides a novel process for the fluid bed reduction of granules of metallic oxides containing varying amounts of nickel, cobalt, copper and iron using an oxidizing gas as a fluidizing medium and liquid hydrocarbon fuels or gaseous reducing agents as reducing media. The process advantageously is carried out on a continuous basis in a single reactor.

Furthermore, the invention provides a unique method for the fluid bed reduction of nickel oxide granules containing minor amounts of cobalt, copper and iron with the production of a highly-reduced granular product which can be marketed directly or melted and cast into shapes for refining or sale.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for the reduction of granulated metal oxide containing at least about 20% nickel and not more than about 40% iron which comprises feeding said oxide to a fluid bed of reduced metal oxide granules, supplying an oxygen-containing gaseous fluidizing medium to said bed, combusting fuel in said fluid bed under conditions of incomplete combustion to produce a combustion-product atmosphere reducing to nickel oxide and to produce a controlled bed temperature not exceeding about 1900° F., and maintaining bed granules in contact with said combustion-product atmosphere for a time sufficient to yield a reduced granular product wherein at least about 80% of the nickel contained in said oxide feed is reduced.

2. A process for the reduction of granulated metal oxide containing at least about 20% nickel and not more than about 40% iron which comprises feeding said oxide to a fluid bed of reduced metal oxide granules, supplying an oxygen-containing gaseous fluidizing medium to said bed, combusting fuel in said bed to produce a combustion-product atmosphere reducing to nickel oxide and to maintain the bed temperature between about 1600° F. and 1900° F., and maintaining bed granules in contact with said combustion-product atmosphere for a sufficient time to reduce at least about 80% of the nickel contained therein and to yield a granular reduced metal oxide product.

3. A process for the reduction of granulated metal oxides containing a major proportion of nickel and a minor proportion of at least one metal from the group consisting of copper, cobalt and iron which comprises feeding said oxide to a fluid bed of reduced metal oxide granules, supplying an oxygen-containing gaseous fluidizing medium to said bed, combusting fuel in said bed to produce a combustion-product atmosphere reducing to nickel oxide in said bed and to heat the bed to a temperature of about 1600° F. to about 1900° F. and maintaining bed granules in contact with said combustion-product atmosphere for a sufficient time to reduce at least about 95% of the nickel contained therein and to yield a granular reduced product.

4. A process for the reduction of granulated nickel oxide which comprises feeding said granulated nickel oxide to a fluid bed of reduced nickel oxide granules, supplying an oxygen-containing gaseous fluidizing medium to said bed, combusting fuel in said bed to produce a combustion-product atmosphere reducing to nickel oxide in said bed and to maintain the bed temperature within the range of about 1600° F. to about 1900° F., and maintaining the bed granules in contact with said combustion-product atmosphere for a sufficient time to yield a granulated nickel product wherein at least about 95% of the nickel contained in the original nickel oxide feed is reduced.

5. A process for the fluid bed reduction of metal oxide granules containing nickel, and varying amounts of copper and cobalt, and containing iron which comprises feeding granules of said metal oxide material with a particle size of not more than about 8 mesh to a fluid bed reactor, supplying an oxygen-containing fluidizing gas to said reactor at a fluidizing rate sufficiently high to maintain said bed in a fluidized condition, supplying a reducing material from the group consisting of oil, natural gas, synthesis gas, hydrogen, and carbon monoxide directly to the fluid bed in an amount in excess of that which would be burned to completion by the oxygen supplied to said reactor in said fluidizing gas and maintaining the temperature in said reactor at between about 1600° F. and about 1900° F. to produce a coarse, granular product which is highly reduced.

6. A process for the fluid bed reduction of metal oxide granules containing at least about 70% nickel which comprises feeding granules of said metal oxide with a particle size of not more than about 8 mesh and not more than about 5% minus 100 mesh to a fluid bed reactor, supplying air to said reactor at a fluidizing rate sufficiently high to maintain said bed in a fluidized condition, supplying a hydrocarbon reducing agent directly to the fluid bed in an amount such that not more than about 60% of said reducing agent is burned to completion by the oxygen supplied to said reactor and maintaining the temperature in said reactor at between about 1600° F. and about 1900° F. to produce a coarse, granular metallic nickel product which is over 80% reduced.

References Cited by the Examiner

UNITED STATES PATENTS

| | | | |
|---|---|---|---|
| 2,000,171 | 5/1935 | Gronningsaeter et al. | 75—82 |
| 2,221,061 | 11/1940 | Simpson | 75—82 X |
| 2,473,795 | 6/1949 | Hills et al. | 75—82 |
| 2,481,226 | 9/1949 | Krebs | 75—26 |
| 2,538,201 | 1/1951 | Kalbach et al. | 75—26 |
| 2,591,595 | 4/1952 | Ogorzaly | 75—26 |
| 2,638,414 | 5/1953 | Lewis | 75—26 |
| 3,020,149 | 2/1962 | Old et al. | 75—26 |
| 3,160,499 | 12/1964 | Pfeiffer et al. | 75—26 |

FOREIGN PATENTS 150    11/1952    Republic of the Philippines.

DAVID L. RECK, *Primary Examiner.*

H. W. TARRING, *Assistant Examiner.*